April 11, 1950 — F. W. JOHNSON ET AL — 2,503,672
ARTIFICIAL FISH BAIT OR LURE
Filed May 1, 1947 — 2 Sheets-Sheet 1

INVENTORS
Frederick W. Johnson.
Charles A. Cornell.
BY
ATTORNEYS

April 11, 1950     F. W. JOHNSON ET AL     2,503,672
ARTIFICIAL FISH BAIT OR LURE
Filed May 1, 1947     2 Sheets-Sheet 2
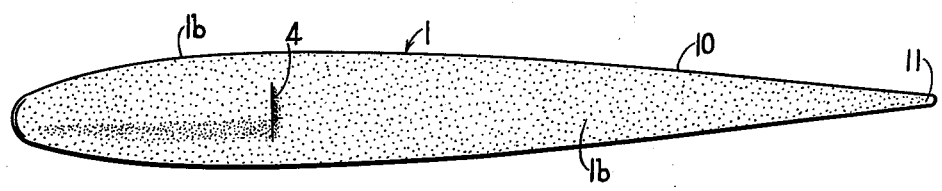
Fig. 9
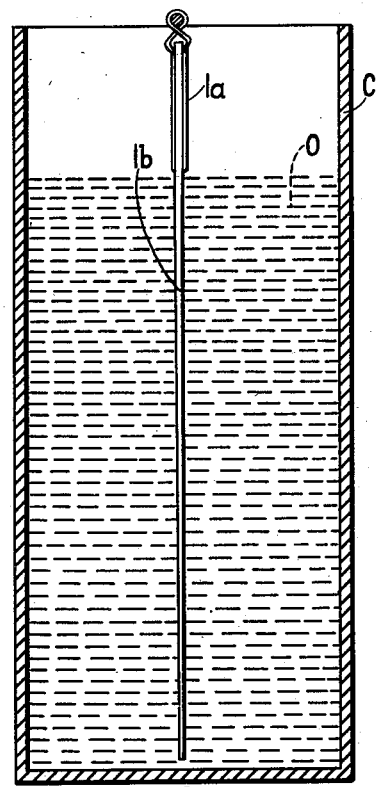 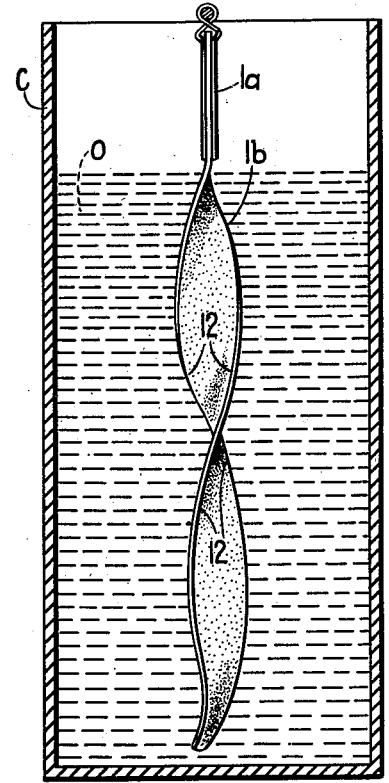
Fig. 10     Fig. 11
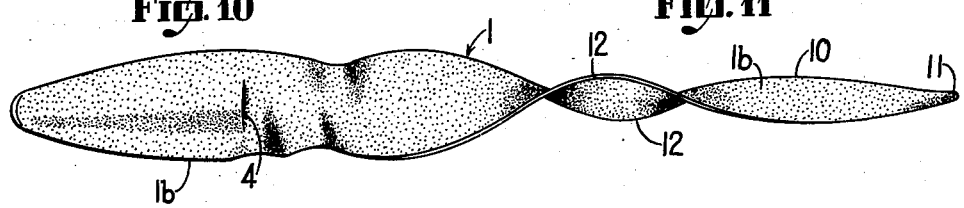
Fig. 12
INVENTORS
Frederick W. Johnson.
BY Charles A. Cornell.
Corbett, Mahoney + Miller
ATTORNEYS Patented Apr. 11, 1950

2,503,672

UNITED STATES PATENT OFFICE 2,503,672

ARTIFICIAL FISH BAIT OR LURE

Frederick W. Johnson, Fort Lauderdale, Fla., and Charles A. Cornell, Johnstown, Ohio; said Johnson assignor to said Cornell Application May 1, 1947, Serial No. 745,338

8 Claims. (Cl. 43—42.24)

Our invention relates to an artificial fish bait or lure. It has to do, more particularly, with artificial bait which is especially useful in deep-sea fishing, both for casting and trolling.

This application is a continuation-in-part of our copending application Serial No. 688,818, filed August 7, 1946, now abandoned.

Various types of artificial bait were provided prior to the invention disclosed in our said co-pending application. However, most of these prior art devices have consisted of strips of flexible material which carry hooks, the flexible material being sufficiently yieldable, theoretically, that it would wiggle as it was pulled through the water so as to resemble a live minnow or fish. In actual practice, the wiggling action would be practically negligible but, in fact, the bait would flop around and would not attract the fish. Another type of prior art bait has consisted of a strip of rigid material, such as metal, shaped to produce a wiggling action as it is pulled through the water, the strip carrying a hook. However, this type of bait is too unnatural in appearance and action and, therefore, is unattractive to the fish. The bait disclosed in our co-pending application has many advantages but we have improved such bait by using means for imparting a tail action to the bait very much like that of natural bait. This action, in addition to the body action imparted by the means disclosed in said co-pending application, results in a more natural appearing and more natural acting bait.

One of the objects of our invention is to provide an artificial fish bait which is very natural in appearance and action so that it will very effectively lure or attract fish.

Another object of our invention is to provide a fish bait or lure of the type indicated which is so designed that a positive and natural bodily wiggling of the bait will occur, when desired, as it is pulled through the water.

Another object of our invention is to provide a fish bait or lure wherein the nature and extent of the bodily wiggling action can be varied readily.

A further object of our invention is to provide a fish bait or lure which is so designed that when pulled through the water it not only will have the bodily wiggling action but will also have a natural tail wiggling action.

Another object of our invention is to provide a fish bait or lure which has the desirable characteristics mentioned above, but which can be made from relatively inexpensive materials and can be manufactured by a simple method and sold at a relatively low cost.

Another object of our invention is to provide a fish lure or bait of the type indicated which is composed of several parts that may be so secured together that there will be no danger of separation during use.

Another object of our invention is to provide a fish bait or lure of the type indicated in the preceding paragraph wherein certain parts can be used over and over again even after other parts may be discarded after long usage.

According to our invention, we provide a fish bait composed of an elongated strip of flexible material. This strip of material may be cut to represent a small fish or minnow. The flexible material is provided with one or more sockets in its side or sides adjacent the forward end thereof. The sockets are adapted to receive the shank of a hook, with its line-connecting chain, and a sinker strip which causes the bait to sink in the water. This sinker strip may be bent to cause the bait to wiggle bodily, when desired, as it is pulled through the water. This sinker strip is adapted to be shaped in a proper manner to produce the bodily wiggling action, for example, it may be bent or preformed with a series of curves along its length either vertically or laterally to produce movement in vertical or horizontal planes or a combination of both, as the bait is pulled through the water. As the bait is drawn through the water, the sinker strip adjacent the forward end, if bent into proper shape, produces a positive bodily wiggling of the entire bait, the flexible tail of the bait enhancing this section. This flexible tail is provided with a series of waves or curves formed inherently therein by a special method which we have devised, so that the tail itself will be positively flexed or wiggled as the bait is pulled through the water. The combination of the bodily wiggling action plus the tail action results in a bait which is very natural in both action and appearance.

The foregoing and other objects and advantages of the present invention will appear from the following description and appended claims when considered in connection with the accompanying drawings forming a part of the specification wherein like reference characters designate corresponding parts in the several views and wherein:

Figure 9 is a flat view of the rubber strip used in forming the bait.

Figure 10 is a diagrammatic view illustrating how the rear or tail part of the rubber strip is soaked in oil to produce a crimp or curl therein.

Figure 11 is a view similar to Figure 10, but showing the rubber strip as the treatment is concluded.

Figure 12 is a view similar to Figure 8 but showing the rubber strip after treatment.

Figure 1:
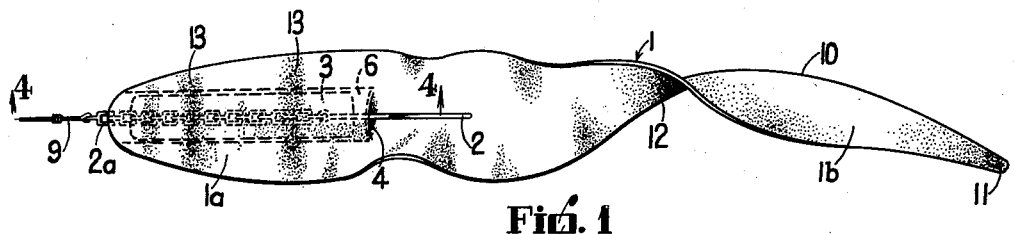
Figure 1 is a plan view of a bait made according to our invention.

With reference to the drawings, we have illustrated in Figures 1 to 8 a preferred form of our fish bait or lure. The bait comprises an elongated narrow, thin strip 1 of flexible material which, in this instance, has a peripheral outline simulating a minnow or fish. This strip 1 is formed of a suitable flexible material such as rubber or a combination of fabric and rubber, or any other suitable flexible material which is waterproof and salt water resistant and which can be curled or crimped in the manner set forth hereinafter.

Adjacent the forward end of the strip 1 there are formed either by vulcanizing or cold curing, if the strip is of rubber, on opposite faces thereof, sockets for receiving, respectively, a hook 2 and its attaching chain 2a, and a metal sinker strip 3. These sockets are formed in the forward part or body 1a of strip 1. The socket 4 is provided for receiving the short hook 2 and chain 2a and is formed on one of the flat faces or sides of the strip, intermediate its top and bottom edges, and both ends of this socket are open. The socket 6 for receiving the metal strip 3 is formed on the opposite face of strip 1 and is open at its forward and rear ends. This socket is formed on strip 1 at substantially the same level as socket 4, as shown best by the dotted lines in Figure 1.

The strip 3 may be made of any suitable metal which can be bent into a predetermined shape and which will, thereafter, retain its shape until it is again preformed. For example, the strip may be made of lead or a soft zinc alloy. The strip is narrow and elongated and is fairly thin.

In assembling the parts of the bait, the strip 3 is first positioned in the socket 6, the strip being inserted through either end of the socket. The shank of the hook 2 is passed into the rear end of socket 4 and the chain 2a is threaded forwardly through the socket. The forward end of chain 2a will extend out of the socket 4. Then a line 9 is attached to the forward end of the chain.

Figure 2:
Figure 2 is a side elevational view of the bait shown in Figure 1.
Figure 3:
Figure 3 is a perspective view of a sinker strip which will be associated with the bait and may be shaped to produce the positive bodily wiggling action of the bait.
Figure 6:
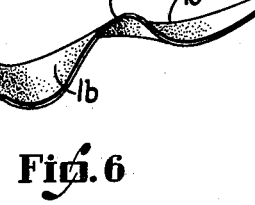
Figure 6 is a perspective view of the bait showing its condition with the sinker strip bent to produce vertical movement.

It will be noted from Figures 1, 2 and 6, that the forward or body part 1a of the strip 1, which terminates substantially at the rear ends of sockets 4 and 6, is of heavier material than its rear or tail part 1b. The tail part 1b not only has edges 10 which taper inwardly from the rear end of body part 1a to a pointed rear end 11, but also decreases in thickness from the body to the rear end. Thus, the flexibility of the tail increases towards its rear end. As will be explained hereinafter, the tail is subjected to treatment which forms curls or crimps 12 at longitudinally spaced intervals throughout its length. Furthermore this treatment produces a twist or corkscrew effect in the thin tail part, as shown best in Figures 1, 2 and 6.

Figure 4:
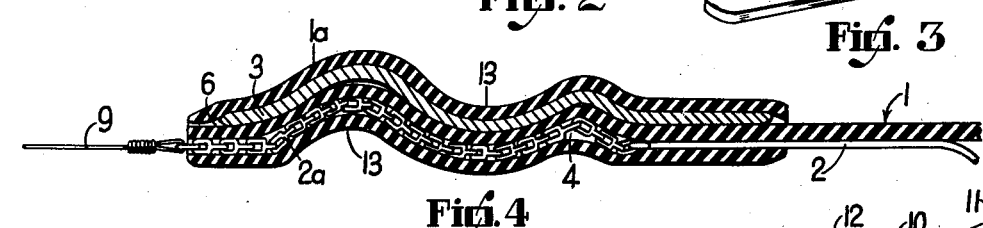
Figure 4 is a longitudinal sectional view taken through the forward part or body of the bait along line 4—4 and showing the sinker strip bent to produce the bodily wiggling action in a vertical plane as the bait is pulled through the water.
Figure 5:
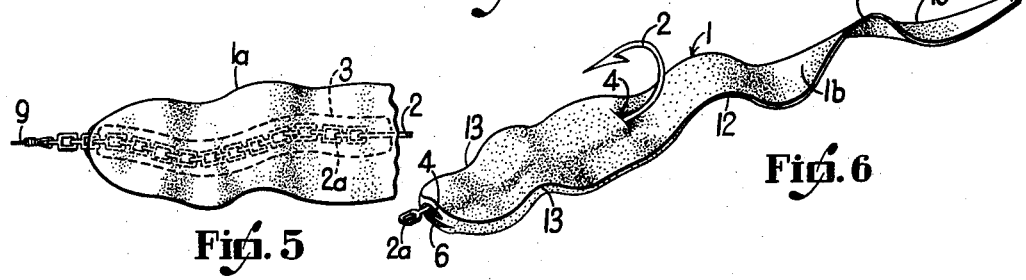
Figure 5 is a top view of the forward portion of the bait illustrating how the sinker strip can be bent to produce lateral bodily wiggling action of the bait in a horizontal plane as it is pulled through the water.
Figure 7:
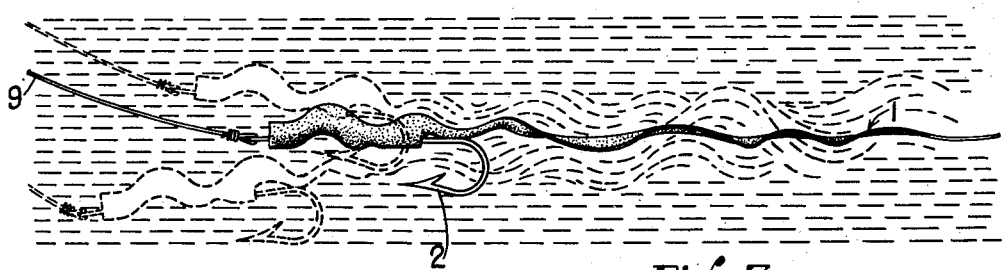
Figure 7 is a diagrammatic view illustrating the action of the bait as it is pulled through the water when the sinker strip has been bent in the manner shown in Figure 6, to produce movement in a vertical plane.
Figure 8:
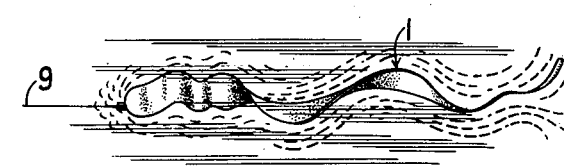
Figure 8 is a view similar to Figure 7 but showing the action of the bait when the sinker strip has been bent as shown in Figure 5 to produce lateral movement of the bait.

If the bait is now pulled through the water, as shown in Figures 7 and 8, the bait will be submerged because of the weight of strip 3, chain 2a and hook 2. The bait will not wiggle bodily unless the strip 3 is bent or curled, as shown in Figures 4 or 5, to produce waves or curls 13 in the body 1a. Even though the strip 3 is not bent, the flexible tail will wiggle, as shown by dotted lines in Figures 7 and 8, and this wiggling action will be both horizontal and vertical or a component thereof because of the twist produced in the tail part. This wiggling action will be due to the inherent flexibility of the tail and to the curls 12 in the tail which will produce positive movement of the tail as the bait is drawn through the water. If it is desired that the bait wiggle bodily or, in other words, traverse a zigzag pattern through the water, in addition to the natural-like movement of the tail, the strip 3 is bent in the manner indicated in Figure 4 or Figure 5 to produce a series of curves 13 along its length. The strip 3 will be bent after it is inserted in the socket 6, chain 2a being flexible to permit this. The strip may be bent in the manner illustrated in Figure 4 to produce curves in the flat body of the type shown in Figure 6. The bait will then act in the manner indicated in Figure 7 and will wiggle bodily in a vertical direction or traverse a vertical zig-zag path as it is pulled through the water and, in addition, the tail will be positively flexed by curls 12, as shown by the dotted lines in this figure. It may also be desirable to obtain movement in a lateral direction. This can be accomplished by bending the strip 3 laterally as shown in Figure 5. With both the lateral and vertical bending of the strip 3, a compound horizontal and vertical movement will result as the bait is pulled through the water, as shown in Figure 8. The extent of the bodily wiggling action and the nature of it may be varied by varying the contour of the strip 3.

To produce the curls or crimps 12 in the tail part of the strip 1, the strip is treated in the manner illustrated in Figures 9 to 12. The strip 1 of Figure 9 is suspended in a container C so that its tail part 1b will be submerged in a liquid treating substance O but the body 1a of the strip will not be submerged. The liquid O is preferably an oil, such as mineral oil, fish oil, etc., which will be at room temperature. The strip is allowed to soak in the oil for a period of approximately 4 to 48 hours, depending upon the type of oil employed. We have found that the oil treatment softens the rubber and also produces the soft curl or crimp and the twist in the tail. However the strip is removed before the oil softens it too much and removes the curl. The strip, after soaking in the oil for the proper period, will be in the condition illustrated in Figure 11. At this time, the strip is removed and will have the appearance illustrated in Figure 12 with the tail curled and twisted.

It will be apparent from the above description that we have provided artificial fish bait having a number of advantages. The bait is natural in appearance and action. The bait may be used without the wiggling action of the body or a positive wiggling action may be obtained. This wiggling action may be varied readily both as to extent and nature. The tail action will be positive but natural. The bait can be made from relatively inexpensive materials and the parts can be assembled or disassembled with ease. When assembled there is no danger of separation or loss of the parts. The hook and the sinker strip of our bait may be used over and over, even though several of the rubber strips are discarded after extended use.

Various other advantages will be apparent from the preceding description, the drawings and the following claims.

Having thus described our invention, what we claim is:

1. An artificial fish bait comprising a flexible strip formed from sheet rubber, a hook carried thereby, an elongated narrow sinker strip also carried by the flexible strip, said flexible strip having waves formed therein along its length.

2. An artificial fish bait comprising a flexible strip formed from sheet rubber, a hook carried thereby, an elongated narrow sinker strip also carried by the flexible strip, said flexible strip being twisted about its axis.

3. An artificial fish bait comprising a flexible strip of elongated form formed from sheet material, said strip being provided with sockets for receiving the shank of a hook and an elongated sinker strip, said flexible strip having a series of curves formed inherently therein along its length.

4. Bait according to claim 3 wherein the flexible strip is also twisted about its axis.

5. An artificial fish bait according to claim 4 wherein the socket for the shank of the hook and the socket for the sinker strip are formed on opposite sides of the flexible strip adjacent the forward end thereof.

6. An artificial fish bait according to claim 5 wherein said sinker strip is made of material which can be deformed and will retain its deformed shape.

7. An artificial fish bait according to claim 6 wherein a flexible member is provided in said hook shank socket, said member being attached to said shank and extending in said hook shank socket for at least a portion of the length of said strip-receiving socket.

8. An artificial fish bait comprising a flexible strip formed from sheet material having body and tail portions, a hook and a wiggle producing member carried by said body, said wiggle producing member being in the form of an elongated strip which is deformable and will retain the shape imparted thereto and will impart such shape to said body, said tail having a series of curves formed inherently therein along its length and said tail also being twisted about its axis.

FREDERICK W. JOHNSON.
CHARLES A. CORNELL.

REFERENCES CITED

The following references are of record in the file of this patent:

UNITED STATES PATENTS

| Number | Name | Date |
|---|---|---|
| 1,264,627 | Foss | Apr. 30, 1918 |
| 1,315,408 | Rabbeth | Sept. 9, 1919 |
| 1,390,767 | Dahlgren | Sept. 13, 1921 |
| 1,485,643 | Streich | Mar. 4, 1924 |
| 1,495,927 | Roland | May 27, 1924 |
| 1,609,090 | Knill | Nov. 30, 1926 |
| 1,777,004 | Lemere et al. | Sept. 30, 1930 |
| 1,913,014 | Van Heurn | June 6, 1933 |
| 1,993,018 | Pfeifle | Mar. 5, 1935 |
| 2,170,919 | Thenes | Aug. 29, 1939 |
| 2,290,433 | Jeffers | July 21, 1942 |
| 2,333,590 | Schueller | Nov. 12, 1943 |
| 2,493,431 | Wold | Jan. 3, 1950 |

Certificate of Correction

Patent No. 2,503,672 April 11, 1950

FREDERICK W. JOHNSON ET AL.

It is hereby certified that error appears in the printed specification of the above numbered patent requiring correction as follows:

Column 2, line 35, for the word "section" read *action*;

and that the said Letters Patent should be read as corrected above, so that the same may conform to the record of the case in the Patent Office.

Signed and sealed this 3rd day of October, A. D. 1950.

[SEAL]

THOMAS F. MURPHY,
*Assistant Commissioner of Patents.*